No. 612,783. Patented Oct. 18, 1898.
G. W. MORETON.
BORING AND TURNING MILL.
(Application filed July 24, 1897.)
(No Model.) 2 Sheets—Sheet 2.
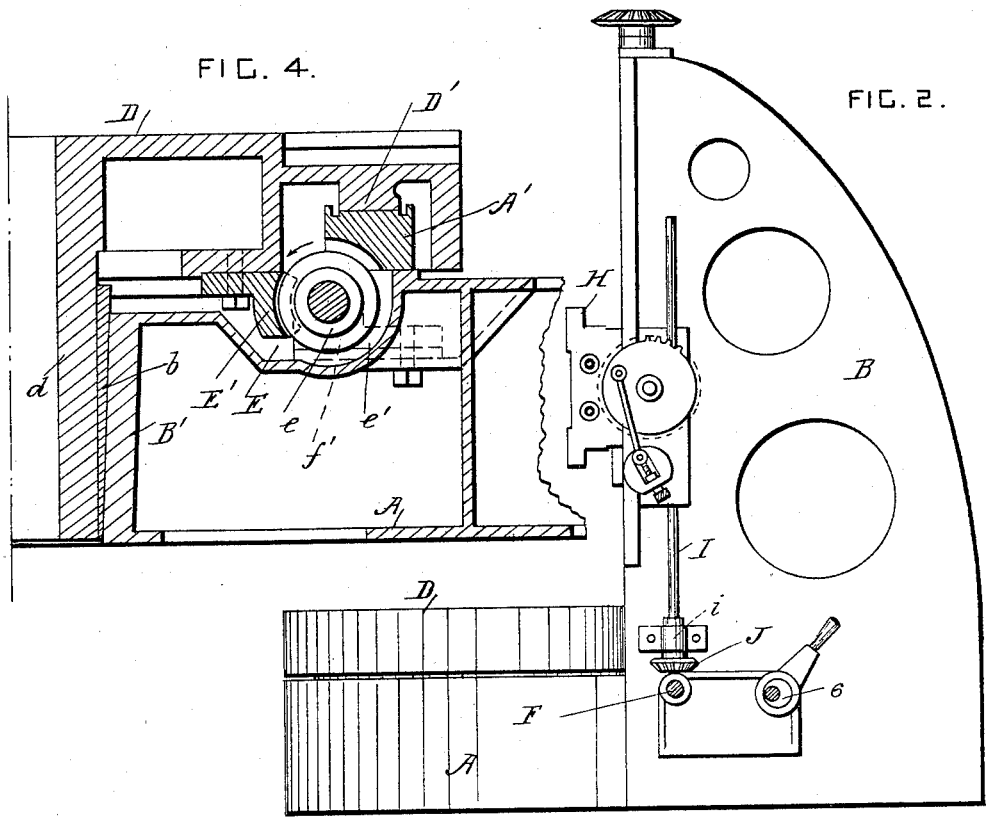
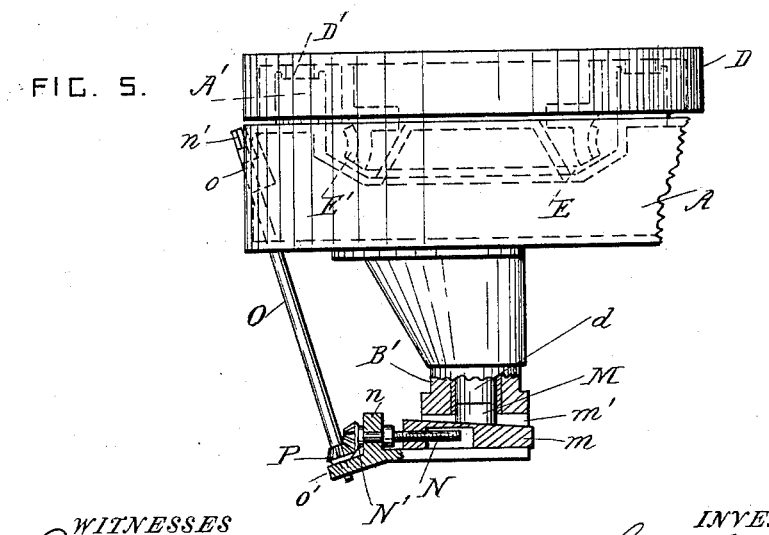
WITNESSES
INVENTOR
George W. Moreton.
by Herbert W. Jenner.
Attorney

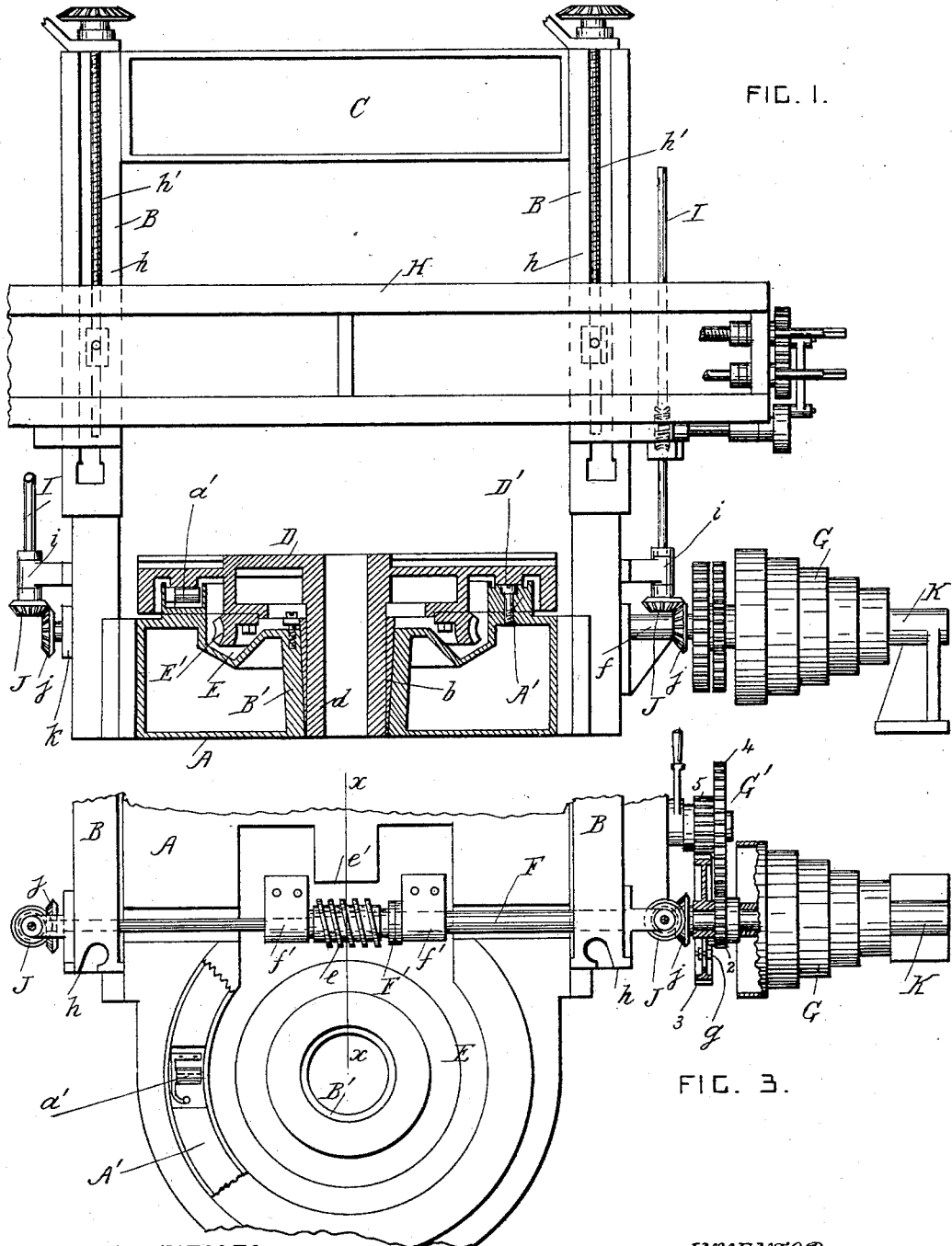

UNITED STATES PATENT OFFICE.

GEORGE WILLIAM MORETON, OF WILMINGTON, DELAWARE, ASSIGNOR TO THE BETTS MACHINE COMPANY, OF SAME PLACE.

BORING AND TURNING MILL.

SPECIFICATION forming part of Letters Patent No. 612,783, dated October 18, 1898.

Application filed July 24, 1897. Serial No. 645,803. (No model.)

*To all whom it may concern:*

Be it known that I, GEORGE WILLIAM MORETON, a citizen of the United States, residing at Wilmington, in the county of New Castle and State of Delaware, have invented certain new and useful Improvements in Boring and Turning Mills; and I do hereby declare the following to be a full, clear, and exact description of the invention, such as will enable others skilled in the art to which it appertains to make and use the same.

This invention relates to boring and turning mills; and it consists in the novel construction and combination of the parts hereinafter fully described and claimed.

In the drawings, Figure 1 is a front view of portions of a boring and turning mill, partly in section. Fig. 2 is a side view, portions of the mill being omitted. Fig. 3 is a plan view of a portion of the base of the mill, showing the driving mechanism. Fig. 4 is a cross-section through the base, taken on the line $x\ x$ in Fig. 3. Fig. 5 is a side view, partly in section, showing a modification of the mill.

A is the base of the mill, and B are the uprights carried by the base. The uprights are secured to the base, and they may be adjusted longitudinally, if desired. C is a cross-piece secured between the top portions of the uprights B. These parts constitute the frame of the mill.

A' is an annular bearing which is preferably bolted to the base A; but it may be cast integral with it, if desired.

B' is a socket formed in the base A and provided with a conical bearing-bush $b$.

D is a horizontal face-plate provided with a central stem $d$, which is journaled in the bush $b$ in the socket B'.

D' is an annular bearing on the under side of the face-plate, which runs in contact with the annular bearing A'.

The bearing A' is provided with one or more oil-rollers $a'$ or other oiling devices of approved construction let into pockets in the bearing and operating to keep the meeting surfaces of the two bearings constantly coated with lubricant.

The base A is provided with an annular depression forming an oil-chamber E in its upper part, and E' is a worm-wheel which is rigidly secured to the face-plate D and which revolves in the said oil-chamber. If preferred, the worm-wheel may be secured to the stem $d$ instead of being bolted to the face-plate.

F is the driving-shaft of the mill, which is journaled in bearings $f'\ f'$. A worm $e$ is secured on the shaft F and gears into the said worm-wheel. The worm $e$ runs in a pocket $e'$, projecting laterally from the oil-chamber E, and is arranged between the two bearings $f'\ f'$.

F' is a thrust-block interposed between one of the bearings $f'$ and the worm. This thrust-block is of any approved construction.

The worm and worm-wheel are constantly supplied with oil, which is placed in the oil chamber and pocket. The worm-wheel is smaller in diameter than the face-plate and is arranged under it, so that the face-plate forms a dust-proof cover for the said oil-chamber. The pocket may be covered by a separate plate (not shown in the drawings) or it may be covered by the face-plate. The worm is revolved in the direction of the arrow in Fig. 4, so that there is no tendency to raise the face-plate.

G is a stepped driving-pulley on the shaft F.

G' is a train of back-gearing of approved construction, by which the pulley G may be connected with the shaft F. A slidable coupling device $g$ of approved construction is provided for connecting the pulley G direct to the shaft F when the back-gearing is thrown out of action. The driving-pulley G is loosely mounted on the shaft F and has the toothed pinion 2 secured to it. The toothed wheel 3, which carries the coupling device $g$, is secured on the shaft F, and the toothed wheels 4 and 5, which gear, respectively, with the pinion 2 and the wheel 3, are secured together and are journaled on the eccentric 6.

H is the cross-rail, which slides vertically on the guides $h$, formed on the uprights B. The cross-rail is raised and lowered by means of screws $h'$, which are provided with driving mechanism of any approved construction for revolving them.

Saddles and tool-slides of approved construction, such as shown in Patent No. 569,344, are carried by the cross-rail; but these parts are not shown, as they do not form a part of the present invention. The feed mechanisms of the saddles and tool-slides are actuated from two vertical shafts I, which are journaled in bearings $i$ secured one on each side of the machine. These two feed-shafts I are connected to the feed mechanisms of the saddles and tool-slides to which they pertain by independent driving mechanisms of approved construction. Portions of one of these driving mechanisms are shown at the right-hand in Fig. 1 and are similar to those described and shown in the aforesaid patent. Each feed-shaft I has a similar beveled toothed wheel J secured on its lower end, and $j$ are beveled toothed wheels secured on the driving-shaft F and gearing into the said wheels J.

K is a bearing for supporting the outer end portion of the driving-shaft F beyond the stepped pulley, and $k$ is a bearing secured to one of the uprights for supporting the opposite end portion of the driving-shaft.

In the modification shown in Fig. 5 the mill is driven by worm-gearing the same as hereinbefore described; but the weight of the face-plate and its stem rests on a center step M instead of on an annular bearing. The annular bearing and the center step can both be used, if desired. A wedge $m$ is provided for adjusting the center step and is slidable in a slot $m'$ in the lower part of the socket B'.

N is a screw which is journaled in a bracket $n$ on the socket B' and which engages with the said wedge.

N' is a beveled toothed wheel secured on the front end portion of the screw N.

O is a shaft journaled in the bearing $o$ on the base A and in a bearing $o'$ on the bracket $n$. The upper end $n'$ of the shaft is square, so that a wrench can be slipped on it for the purpose of revolving it.

P is a beveled wheel secured on the shaft O and gearing into the beveled toothed wheel N'.

What I claim is—

1. The combination, with the base portion of a boring and turning mill provided with an annular depression forming an oil-chamber, a pocket on one side of the said chamber also for holding oil, and an annular bearing above the said chamber and pocket; of a revoluble face-plate running on the said annular bearing and forming a cover for the said oil-chamber, shaft-bearings secured in the said pocket, a driving-shaft journaled in the said shaft-bearings, a worm and a thrust-block mounted on the said shaft, said worm, thrust-block and shaft-bearings all being constantly lubricated by the oil in the said pocket, and a worm-wheel secured to the said face-plate in gear with the said worm and constantly lubricated by the oil in the said chamber, substantially as set forth.

2. The combination, with the base portion of a boring and turning mill provided with an annular depression forming an oil-chamber, and an annular bearing arranged above the said oil-chamber; of a revoluble face-plate running on the said bearing and forming a substantially dust-proof cover for the said oil-chamber, and a worm-wheel secured to the said face-plate and depending within the said oil-chamber, substantially as set forth.

3. The combination, with the base portion of a boring and turning mill provided with an annular depression forming an oil-chamber, and an annular bearing arranged above the said oil-chamber; of a revoluble face-plate running on the said bearing and forming a substantially dust-proof cover for the said oil-chamber, a driving-shaft journaled crosswise of the said base, a worm secured on the said shaft and dipping into the said oil-chamber, and a worm-wheel secured to the said face-plate and depending within the said oil-chamber and gearing into the said worm, substantially as set forth.

In testimony whereof I affix my signature in presence of two witnesses.

GEORGE WILLIAM MORETON.

Witnesses:
JOHN C. PECK,
JOHN W. PEREGOY.